United States Patent
Metz

[11] 3,729,996
[45] May 1, 1973

[54] AVERAGING DIGITAL RATE INDICATOR

[75] Inventor: Thomas R. Metz, Haddonfield, N.J.

[73] Assignee: Conoflow Corporation, Blenheim, N.J.

[22] Filed: Sept. 16, 1971

[21] Appl. No.: 180,958

[52] U.S. Cl.............73/194 E, 73/231 R, 235/92 FL, 235/92 MT
[51] Int. Cl................................................G01f 1/00
[58] Field of Search.....................73/194 E, 113, 114, 73/231 R; 235/151.34, 92 DM, 92 FL, 92 MT, 92 WT

[56] References Cited

UNITED STATES PATENTS

| | | | |
|---|---|---|---|
| 3,549,868 | 12/1970 | Watson et al. | 235/92 DN |
| 3,340,386 | 9/1967 | Hurst | 235/92 FL |

*Primary Examiner*—James J. Gill
*Attorney*—C. Cornell Remsen, Jr. et al.

[57] ABSTRACT

Electric pulses having a widely fluctuating rate to be measured are divided by a factor n ranging between 2 and 9, inclusive. A time base generator produces pulses having a constant rate defining a given period of time during which the measurement would normally be made if the rate of the electric pulses to measured were constant. The pulses from the time base generator are also divided by N having a value equal to the division factor of the electric pulses. A counter counts the number of electric pulses during the multiplied given period of time. The contents of the counter are then transferred to a digital readout device the reading of which is the average rate of the widely fluctuating rate measure during the multiplied give period of time. The given period of time is selected so that the readout device will present a direct visual reading in units of measure per unit of time, such as gallons per hour for a fluid. The rate fluctation of the electric pulses may be proportional to the rate fluctuation of a quantity being measured, such as fluid flow, fluid consumption or revolutions of an engine.

14 Claims, 2 Drawing Figures

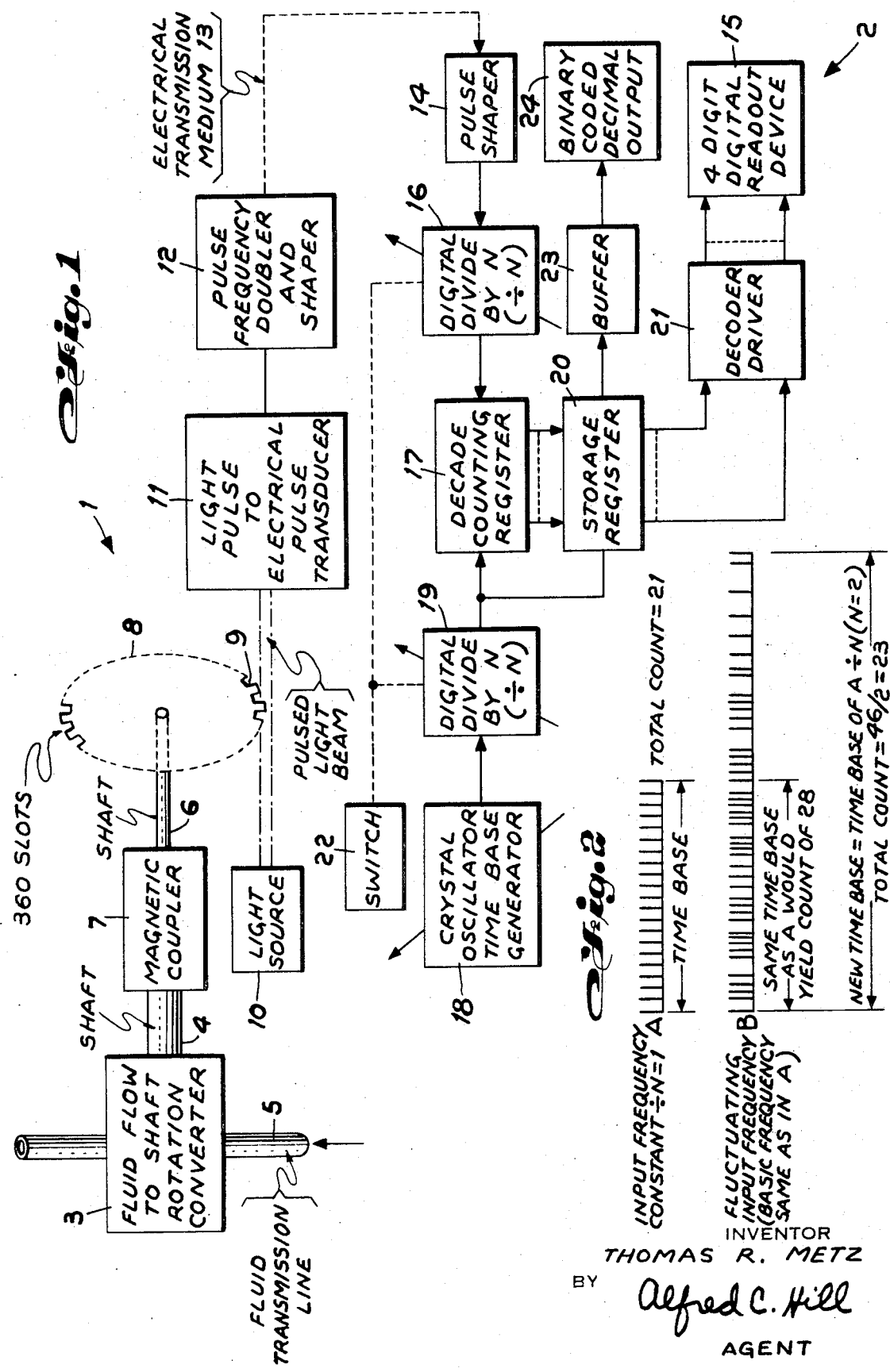

AVERAGING DIGITAL RATE INDICATOR

BACKGROUND OF THE INVENTION

This invention relates to rate indicators and more particularly to digital rate indicators.

Basically a rate measuring system includes a measuring means at times interchangeably referred to herein as a meter or transmitter which converts the rate of a quantity, such as fluid flow, fluid consumption or revolutions of an engine, into an electric signal and a remote indicating means to convert the electric signal into a visual readout of the value of the rate being measured. Such a rate measuring system must meet the following design parameters.

1. The electric measuring means must be isolated from the fluid being measured.
2. The recording or indicating device should be capable of being separated long distances from the transmitting device.
3. The transmitting device should be capable of transmitting long distances without signal distortion or pickup of electric noise.
4. Both the signal transmitting device and the indicating device should be capable of operating from 12 to 14 volts DC (direct current) and if necessary with optional 115 volt AC (alternating current), 60 hertz (Hz) operation.
5. The transmitted signals should not be distorted by transmission lines impedance or temperature..
6. The transmitted signal should be digital in nature preferably a pulse frequency, and the frequency should be between 100Hz and 2,000Hz.
7. The method of detecting flow, rate should not introduce any friction or load on the meter or transmitter itself.
8. The housing should be explosion proof, weather proof, rugged and capable of withstanding severe vibration such as experienced in automotive engines on the road.
9. Modular construction should be used for the ease of servicing.

Several known meters are capable of being employed as the meter of a rate measuring system namely, orifice meters, variable area flow meters, and turbine meters all of which are basically flow rate measuring devices at rates greater than one gallon per minute. Except for the turbine meter, the method of measuring is basically analog in nature. Even a turbine meter, however, can be considered an analog measuring device because the pulse frequency that it generates is quite high.

It has been shown that a four piston type positive displacement flow meter is ideally suited for low flow measurements but that it is basically a totalizing type of meter. One of the major difficulties in converting a positive displacement meter to a flow rate measuring device is the fact that the crank shaft speed at maximum flow rate only amounts to about two revolutions per second and at minimum flow rate is only 0.2 revolutions per second. The generation of any type of electrical signal from this speed of rotation is quite difficult. Generally, DC tachometers, AC tachometers or other rotational type of electric signal generators are not suitable for application with a positive displacement meter because they introduce friction or other inertial loads on the meter itself. Proximity probes using gear teeth as a method of generating pulses are generally not satisfactory because the magnitude of the signal generated at very low speeds is so small that they are almost unusable or are very susceptible to pick up of electric noise.

Indicating means providing the desirable visual readout for rate measuring systems have in the past included analog low flow rate indicators used in conjunction with the low flow transmitter to develop an analog milliampere signal that is proportional to the flow rate through a meter. The incoming pulse from the low flow transmitter is passed through pulse shaping and noise elimination circuits that use a zener diode referenced threshold technique to eliminate any noise signal at voltages of less than approximately 4 volts DC. Since the voltages of the pulses coming from the transmitter are greater than 5 volts DC, it is possible to eliminate practically all the electrical noise generated on the transmission line. The shaped pulse frequency is then passed through an operational amplifier integrating circuit that converts the pulse frequency into an analog voltage which is directly and linearly proportional to the pulse frequency. This analog voltage then drives a constant current source which generates 0 to 5 milliampere current signal that can work into impedances of from 0 to 2,000 ohms. If direct indication is needed, the milliampere signal can operate a conventional 0 to 5 milliampere meter movement. If a voltage signal is needed to provide the input to a computer or data logging type devices, the use of a 2,000 volt impedance can generate a 0 to 10 volt DC signal. Range and zero adjust potentiometers are available for calibrating the milliampere signal or indicating device to the exact flow rate range to be indicated. Internal damping of the analog signal is used to eliminate the variations of the pulse frequency at the low flow rates. As a result the time constant of the output circuit is approximately two seconds. In addition to the conversion of the pulse frequency to an analog signal, the prior art analog indicating device includes a power supply to generate the 12 to 14 volt DC power for the low flow rate transmitter. This is a zener diode regulated supply voltage capable of supplying the necessary current to the flow transmitter over long distances. All power sources and signal sources are referenced to ground for noise elimination.

One of the main disadvantages of using analog readout devices is the accuracy of the indicating device itself. Usually the accuracy of the milliampere movement is on the order of one to two percent of full scale accuracy. Also the problems of linear conversion of pulse frequency to analog voltages or currents is subject to error. The net result is the accuracy of the measurement leaves something to be desired. The advantage of the digital counter devices is that the accuracy can be essentially the accuracy of one pulse as a ratio of the total number of pulses being counted over a period of time. In other words, the use of digital techniques permits the absolute measurement of the pulse frequency so that the accuracy of the overall system is determined by the flow transmitter only and not any associated equipment.

As previously noted hereinabove, the electric output of the low flow transmitter is a pulse frequency which has a repetition rate proportional to the flow rate through the transmitter. One type of commercially available digital indicator that can be used to measure the flow rate through the transmitter is a frequency counter or pulse counter. This is a Nixie tube type of pulse counter that counts the number of pulses coming in from some source and displays it on the Nixie tubes for a length of time called the time base. The time base is usually a decade type of device that measures time from 0.01 seconds to 0.1 second to 1 second and also 10 seconds. By using the one second time base the number that would appear on the Nixie tubes would be the pulses per second or the frequency of the source. For a given flow through the meter then, a number would appear on the frequency counter and by calculation could be reduced to engineering units, such as gallons per hour, pounds per hour or revolutions per minute. There are a number of difficulties that are quite obvious from this approach. The first difficulty is that not only is there needed a frequency counter but there is also needed a supply for the low flow transmitter which would have to be an external piece of equipment. The second difficulty is that the flow rate would have to be calculated from the frequency counter and, therefore, would take a considerable amount of time and possibly result in error. The third difficulty is that the time base is in decades. In cases where the flow rate is quite constant for a given value, a time base of one second would be acceptable, since the number that would appear on the frequency counter every second would be generally a steady number. However, in many cases the flow rate varies quite rapidly and widely and if a one second time base is used, the number that would appear on the frequency counter every second would be varying quite a bit and would be extremely difficult to read. The only alternative available in this arrangement would be to increase the time base to 10 seconds. In other words, the number of pulses are counted from the low flow transmitter for a 10 second period rather than a 1 second period and, therefore, the number would tend to be more steady. However, in reading the number of the Nixie tubes it would have to be remembered that the number now is ten times as great as it was if there was used a one second time base and, therefore, the decimal point would have to be moved. The fourth difficulty is that most laboratory types of frequency counters are quite susceptible to noise levels that are common in the process control industry. Therefore, these frequency counters are liable to have counts appear that are not the true counts of the number of pulses that are coming from the low flow transmitter.

Another type of commercially available frequency counter that could be used for the measurement of flow rate from the low flow transmitter would be a device called a pre-set digital counter. The only difference between this type of device and the conventional type of frequency counter employing the Nixie tubes is that the time base can now be selected to any value between certain limits. In other words, rather than just having decade amounts of time, such as one second or ten seconds, any time period can be selected to three decimal points. In the terminology employed herein this is called the integrating time and if properly selected, the number that would appear on the Nixie tubes would be in engineering units, that is, units of measure per unit of time. However, once an integrating time has been selected so that a given engineering unit number would appear on the readouts, if this integrating time would be in the area of one or two seconds of duration, a rapidly varying flow rate would cause the engineering unit number of flow rate to change quite rapidly and widely and be difficult to read. Since this integrating time was determined in order to have the flow rate read in engineering units, the only alternative available would be to increase the integrating time by a factor of ten in order to average the readout to a more constant number. In the case of the frequency counter, it was necessary to move the decimal point as a result of using a time base of ten times a length and, therefore, the same problem occurs here, namely, that the decimal point would have to be moved one digit on the digital readout in order to have the flow rate read in the correct engineering units. Of course, there is still the problem of requiring an external power supply for the low flow transmitter and also the problem that these devices are susceptible to noise pulses that would appear.

SUMMARY OF THE INVENTION

An object of the present invention is to provide a digital rate indicator that will provide a steady readable visible readout even in the face of a widely fluctuating rate of the input signals.

Another object of the present invention is to provide an improved rate measuring system overcoming the above-mentioned disadvantages and meeting the above-mentioned design parameters.

Still another object of the present invention is to provide a rate measuring system incorporating as the transmitter thereof a positive displacement meter.

A feature of the present invention is the provision of an averaging digital rate indicator comprising a first source of electric pulses having a widely fluctuating rate to be measured; a second source of electric pulses having a constant rate defining a given period of time during which the measurement is to be made; first means coupled to the first source to divide the fluctuating rate of the electric pulses at the output of the first source by a factor N, where N is an integer greater than one; second means coupled to the second source to divide the constant rate by a factor N and thereby multiply the given period of time by a factor N; third means coupled to the first and second means to count the pulses at the output of the first means during each of the multiplied given period of time; and fourth means coupled to the third means to provide a digital readout of the count of the third means at the end of each of the multiplied given period of time, the count of the third means being the average rate of the fluctuating rate during the multiplied given period of time.

Another feature of the present invention is the provision of the averaging digital rate indicator as defined immediately above wherein the flucutating rate is proportional to rate fluctuations of fluid flow; and the first source includes a transmission line for the fluid, fifth means coupled in the transmission line to convert the rate of flow of said fluid to rotation of a first shaft, a second shaft, magnetic means coupled to the first and second shafts to transfer the rotation of the first shaft to the second shaft, a disc having a given number of teeth on the periphery thereof connected to and rotated by the second shaft, a source of light converted to light pulses by the teeth of the rotating disc, the light pulses having a frequency proportional to the rate of rotation of the disc and the given number of teeth, sixth means responsive to the light pulses to convert the light pulses into electric pulses having the frequency of the light pulses, and seventh means coupled to the sixth means to shape and double the frequency of the electric pulses produced by the sixth means to provide the electric pulse output of the first source.

BRIEF DESCRIPTION OF THE DRAWING

Above-mentioned and other features and objects of this invention will become more apparent by reference to the following description taken in conjunction with the accompanying drawing, in which:

FIG. 1 is a schematic block diagram of the digital rate indicator in accordance with the principles of the present invention; and FIG. 2 is a series of waveforms useful in explaining the operation of the arrangement of FIG. 1.

DESCRIPTION OF THE PREFERRED EMBODIMENT

Referring to FIG. 1, there is illustrated therein a rate measuring system including a transmitter or meter 1 and a receiver or indicator 2 in accordance with the principles of the present invention. Under the heading "Background of the Invention" thereinabove the difficulty in converting a positive displacement meter to a slow rate measuring meter was discussed. In accordance with the principles of the present invention such a positive displacement meter has been modified to perform the rate measuring function in accordance with the present invention. In accordance with FIG. 1 meter 1 includes a fluid flow to shaft rotation converter 3 which is a positive displacement meter type arrangement. In a reduction to practice of the present invention, shaft 4 associated with converter 3 rotating at a rate proportional to the rate of flow of the fluid in transmission line 5 is magnetically coupled to shaft 6 by magnetic coupler 7. Shaft 6 is coupled to a disc 8 having slots or teeth 9 on the peripheral thereof in communication with light from light source 10. Teeth 9 of disc 8 pulses the light from source 10 at a repetition rate proportional to the rotation of the disc which in turn is proportional to the rate of flow of the fluid in transmission line 5. In the positive displacement meter in the reduction to practice of the present invention, the electric pulse generating section of the meter is isolated from the fluid portion of the meter by magnetic coupling 7. The crank shaft rotation of converter 3, such as shaft 4, causes an inner magnet to rotate and an outer magnet to follow this rotation while a non-magnetic shield seals the fluid being measured from the electrical section. The ring magnet is a very strong torque device utilizing six magnetic poles on the inner radius on the ring magnetic and a driver magnet. The rotation on the inner ring magnet is transmitted to slotted disc 8 through precision instrument bearings. These bearing essentially introduce no friction to the measuring device. The pulse generation is done by use of a 0.007 inch thick stainless steel disc of approximately 1⅞ inches in diameter that has 360 slots engraved on its outer diameter or periphery. A lense type bulb provided in source 10 focuses a light beam through a 0.007 inch thick slit, through slots 9 of disc 8 and onto the surface of a light pulse to electric pulse transducer 11, such as a photo transistor. As the slot passes over the light beam, it permits the beam of light to impinge upon transducer 11 in the form of a photo transistor and causes the photo transistor to conduct current. When the slot is not permitting the light beam to pass through to the photo transistor, the photo transistor is turned off. As a result of this rotation of slotted disc 10 between the light source and the photo transistor, a pulse frequency of 360 pulses per revolution of the disc is generated. This pulse frequency is then passed through a pulse frequency doubling and shaping circuit 12 and, hence, a current amplifier that results in a frequency of 720 pulses per revolution of the disc and a power level that will permit successful transmission to the receiver. The electronic circuitry of transmitter 1 operates from 12 to 14 volts DC and the transmitted pulse has a magnitude of approximately 8 volts DC. The lightbulb of source 10 is operated at reduced voltages so that its life is estimated to be about 50,000 hours. It can be easily changed if necessary in he configuration employed. All of the electronics are mounted in an explosion proof and weatherproof housing and is an integral part of the flow meter itself and is easily mounted in the line or on a wall if necessary.

Table I presented hereinbelow shows the pulse frequency for three types of positive displacement meters produced by Conoflow Corporation along with the pulses per gallon of fluid passed through the meter and the integrating time that would be employed in indicator 2.

TABLE I

| Model | Flow rate, g.p.h. | Pulse frequency, p.p.s. | Pulses/ gallon | Integrating time, seconds |
|---|---|---|---|---|
| DP31-1447 | 0.15-3.0 | 63-1,260 | 152,416 | 2.378 |
| DP31-1448 | 0.30-6.0 | 65-1,260 | 76,208 | 4.756 |
| DP31-1449 | 4.0-80.0 | 122-2,440 | 109,469 | 3.2886 |

Where GPH is equal to gallons per hours and pps is equal to pulses per second

The pulse frequency at the output of frequency doubler and shaper 12 is transmitted over transmission medium 13 to the input of the indicating arrangement of the rate measuring system in accordance with the principles of this invention.

Conoflow Corporation has designed a model DR31-1491 identified as a digital low flow rate indicator which is illustrated in block diagram form in FIG. 1 as indicator 2. This indicator overcomes the four main difficulties with the commercially available frequency counters described hereinabove under the heading "Background of the Invention." This flow rate indicator was designed to operate in conjunction with the Conoflow Series DP low flow transmitters and, hence, its input circuitry is designed to operate from input pulses of from 5 to 10 volts DC in amplitude. These input pulses from transmission medium 13 are fed to a pulse shaper 14 which is biased to turn on at a plus 4 volts, thus insuring that noise pulses induced in the input in the transmission medium 13 of up to 4 volts will not cause false counts. Above 4 volts the input pulses drive an amplifier that generates the pure square wave pulses that are necessary to do the actual counting in the device itself. Pulse frequencies from 0 to 10,000 Hz can be indicated. This frequency capability would also handle other devices such as turbine meters, pulse type tachometers, and so forth. An internally adjustable variable time base for a setting of integrating time is available from 0.001 second to 19.999 seconds in 0.001 increments. These adjustments are located inside the digital flow rate indicator so that unauthorized persons cannot change the settings. By setting the proper integrating time by these adjustments, the reading on the visual readout indicator will be in desired engineering units.

As mentioned previously under the heading "Background of the invention," when a flow is varying quite rapidly, as is the case most of the time, it is always a question of just how to read this flow rate. If it is desired to read every peak and valley of the flow rate changes, then a very fast reading is required. However, if it is only necessary to see the general trend of the flow rate then the reading time can be extended to average out all of the maximum and minimum values of flow rate changes. If there is a rapid change in the flow rate, the indicator would not indicate this change of flow rate immediately since it would be averaging over a long period of time. As indicated in the case of the frequency counters mentioned hereinabove under the heading "Background of the Invention," a selection of decade extension of the time base may be too extreme for the measurement of fast flow rate changes to an averaging of the flow rate. In other words, if an integrating time of two seconds was required in order to read in engineering units, but this was too fast because of the rapidly changing flow rate, then these prior art devices could only be extended to twenty seconds which is quite a long time when trying to measure flow rate. Experience so far indicates that readings taken of intervals of less than 10 seconds are usually sufficient to average out rapidly changing flow rates. In order to utilize the feature of having an integrating time that will calculate the flow rate in engineering units and also be able to select a reading time that would be sufficient to permit a widely varying number to appear on the counter, there has been incorporated a circuit called "divide by N circuit" that permits digital averaging of flow rate changes.

Before discussing this novel feature first there will be described how integrating times are determined to read in engineering units. The Conoflow model DR31-1491 indicator uses four digital readout numbers (like a digital clock) in digital readout device 15 so that a maximum number of 9999 can be read. In order to determine the integrating time to read this number in the proper engineering units, it would be necessary to determine the range of the particular meter in terms of those engineering units. For instance, if it was desired to read U. S. gallons per hour with the Conoflow model DP31-1448 low flow transmitter it is known that its flow range is from 0.30 U. S. gallons per hour to 6.0 U. S. gallons per hour (see TABLE I). The 6.0 U. S. gallons per hour is the largest flow rate that would be necessary to read and it would also be desirable to use all four digits of the readout. Therefore, the highest flow rate would be read on device 15 as 6.000 U. S. gallons per hour. But in making this number appear in the digital readouts, it would require 600 pulses to make the lights light up in this manner. It would require 30 pulses to make the minimum flow rate show on the indicator as 0.300 U. S. gallons per hour. The integrating time is determined by dividing the number of pulses to make the number read on the digital readout divided by the actual flow rate in the particular engineering units required. This number is again divided by the number of pulses that the flow transmitter would transmit per unit of flow. In the particular example employed herein the integrating time would be 600 divided by 6.0 divided by 76,208 (taken from the pulse/gallons column of TABLE I for the DP31-1448 meter). The units of this answer would be hours and since the integrating time is desired in seconds it would be necessary to multiply this number by 3600. Thus, the integrating time for the DP31-1448 model to read in U. S. gallons per hour would be approximately 4.756 seconds. Several examples follow showing the method described above for calculating the integrating times for the various engineering units and Table I tabulates integrating times for the various Conoflow meters to read in U. S. gallons per hour.

1. Assume flow range to be 4.0 GPH to 80.0 GPH of a fluid having a specific gravity of 1. Read flow rate in pounds per hour Calculation 1.0 U. S. Gallon = 8.347 pounds (lbs.).

Therefore, flow range = 33.388 lbs./hr to 667.76 lbs./hr.

Use a Conoflow model DP40-1449 transmitter with 109.469 pulses/gallon which is equal to 13,102 pulses / lbs.

The largest number to be read is 667.7 lbs./hr or 6677 pulses Therefore, integrating time = 6677/667.7 × 1/13,102 × 3600 = 2.748 seconds.

2. Assume a tachometer is attached to an engine whose maximum RPM (revolutions per minute) is 5000 and the tachometer generates 50 pulses/revolution of the engine. Read in RPM.

Calculation

The range is 0 to 5000 RPM.

The largest number to be read is 5000 RPM or 5000 pulses.

The pulses/revolution are 50.

Therefore, Integrating Time = 5000/5000 × 1/50 × 60 = 1.200 seconds.

Looking at the DP31-1447 meter of TABLE I, in a particular application an integrating time of 2.378 seconds may cause a digital number to vary quite rapidly in the least significant digit. As previously noted in the case of frequency counters the only alternative would be to use an integrating time of 23.78 second in order to have the number readout in the correct engineering units despite the fact that the decimal point will have to be moved one point to the left. FIG. 1 shows a diagram of the "divide by N" feature that has been incorporated in the Conoflow indicators. This comprises a digital divide by N device 16 coupled between pulse shaper 14 and decade counting register 17, a crystal oscillator time base generator 18 which has a frequency adjusted to the selected integration time and a digital divide by N device 19 coupled between generator 18 and decade counting register 17. Register 17 is coupled to a storage register 20 and this storage register 20 is also coupled to the output of the digital device 19. The output of the storage register 20 is applied to a decoder-driver 21 to decode the count of register 20 and as a result thereof the count contained in register 17 so as to properly drive the four digit digital readout device 15 to provide therein a visual readout of the count of register 17.

If the divide by N device 16 setting is such that N-1 then the integrating time would be 2.378 seconds and device 15 would readout in the correct engineering units, the integrating time being established by generator 18. However, if every other pulse that came in from the flow transmitter were, in other words, divide by 2, (N = 2), the integrating time would be 4.756 seconds or the indicator would be averaging over a length of time twice as long as previously. In order to keep the readout in the correct engineering units without a change in he decimal point it would be necessary to also divide the timing pulses from generator 18 by a factor of two by 2, or take every other pulse to set the time base. In other words, due to the action of divider by N device 16 and divide by N device 19 counting register 17 will be counting half as many pulses over twice as long a time so that the engineering units of the digital readout device 15 would remain the same no matter what the value of N was set at. The value of N may be as high as nine thereby providing a range of integer values for N from 2 to 9, inclusive, in the Conoflow low rate indicators which will cover the longest time necessary for adequate averaging of the flow rate changes. A separate knob inside the indicator sets the decimal point in the proper position on the indicator depending upon the engineering units being read and a separate switch 22 is provided so that the divide by N factor of both devices 16 and 19 are simultaneously changed with the value of N always being equal in these two devices.

Curve A, FIG. 2 indicates a count of 21 when N = 1, the input frequency from shaper 14 is constant and the time base is as illustrated. On the other hand, when the input frequency, having the same basic frequency as in Curve A, FIG. 2 fluctuates as shown in Curve B, FIG. 2, the count for N = 1 would be 28, but when N = 2 a new time base, twice as long as the original time base, is established, and the total average count would be 46/2 = 23. If N = 3 or higher, the total average count would in all probability come closer to or equal the count of 21.

Also built into the DR31-1491 Conoflow indicator is a power supply for the low flow transmitter. Thus, the indicator as disclosed herein has overcome the four main disadvantages of the commercially available digital readout devices. Another important feature of this indicator is that all logic and counting devices operate at voltages less than +10 volts DC. Therefore, the indicator can be operated from 12 to 14 volt DC supply that is available in automotive batteries, or from 115 volts, 60 cycle AC or 230 volts, 50 cycle AC. Anyone of these options is selectable by the proper wiring position of the switch in the rear of the Conoflow device. Modular construction is used throughout minimizing the time required for serviceing this indicator. All major circuit functions are removable and can be replaced with spare circuit boards conveniently. The digital readouts are seven segment incandescent bulb type readouts where the bulbs are long life type operated at reduced voltages.

Another feature that is quite important in any digital readout equipment is the availability of the indicated quality in what is known as binary coded decimal form. Since all pulse counting and calculations in the circuitry is done by binary arithmetic, all decimal numbers are available in the binary equivalent number and this number can be made available at a connector for use by accessory equipment. This connection is located in the rear connector box. The binary coded decimal signal is removed from the storage register 20 by buffer 23 to provide the binary coded decimal output 24. The output 24 permits easy use with remote data loggers or digital computers.

While I have described above the principles of my invention in connection with specific apparatus it is to be more clearly understood that this description is made only by way of example and not as a limitation to the scope of my invention as set forth in the objects thereof and in the accompanying claims.

I claim:

1. An averaging digital indicator comprising:
    a first source of electric pulses having a widely fluctuating rate to be measured;
    a second source of electric pulses having a constant rate defining a given period of time during which the measurement is to be made;
    first means coupled to said first source to divide said fluctuating rate of said electric pulses at the output of said first source by a factor N, where N is an integer other than one;
    second means coupled to said second source to divide said constant rate by a factor N and thereby multiply said given period of time by a factor N;
    third means coupled to said first and second means to count the pulses at the output of said first means during each of said multiplied given periods of time; and
    fourth means coupled to said third means to provide a digital readout of the count of said third means at the end of each of said multiplied given periods of time, said count of said third means being the average rate of said fluctuating rate during said multiplied given period of time;
    said third means including
    a decade counting register; and
    said fourth means including
    a storage register coupled to said counting register and said second source,
    a decoder coupled to said storage register, and
    a four digit digital readout device coupled to said decoder.

2. An indicator according to claim 1, wherein said given period of time is selected so that said fourth means provides said digital readout in desired engineering units of measure per unit of time.

3. An indicator according to claim 1, wherein the value of N for both said first and second means is identical.

4. An indicator according to claim 3, wherein the value of N is selected from the range of integers 2 to 9 inclusive.

5. An indicator according to claim 1, wherein the value of N is selected from the range of integers 2 to 9 inclusive.

6. An indicator according to claim 1, wherein said fluctuating rate is proportional to rate fluctuations of fluid flow; and said first source includes a positive displacement type fluid flow meter.

7. An averaging digital indicator comprising:

a first source of electric pulses having a widely fluctuating rate to be measured;

a second source of electric pulses having a constant rate defining a given period of time during which the measurement is to be made;

first means coupled to said first source to divide said fluctuating rate of said electric pulses at the output of said first source by a factor N, where N is an integer other than one;

second means coupled to said second source to divide said constant rate by a factor N and thereby multiply said given period of time by a factor N;

third means coupled to said first and second means to count the pulses at the output of said first means during each of said multiplied given period of time; and fourth means coupled to said third means to provide a digital readout of the count of said third means at the end of each of said multiplied given periods of time, said count of said third means being the average rate of said fluctuating rate during said multiplied given period of time;

said fluctuating rate being proportional to rate fluctuations of fluid flow; and said first source including a transmission line for said fluid, fifth means coupled in said transmission line to convert the rate of flow of said fluid to rotation of a first shaft, a second shaft, magnetic means coupled to said first and second shaft to transfer the rotation of said first shaft to said second shaft, a disc having a given number of teeth on the periphery thereof connected to and rotated by said second shaft, a source of light converted to light pulses by the teeth of said rotating disc, said light pulses having a frequency proportional to the rate of rotation of said disc and said given number of teeth, sixth means responsive to said light pulses to convert said light pulses into electric pulses having said frequency of said light pulses, and seventh means coupled to said sixth means to shape and double the frequency of said electric pulses produced by said sixth means to provide said electric pulse output of said first source.

8. An indicator according to claim 7, wherein said given period of time is selected so that said fourth means provides said digital readout directly in gallons per hour of said fluid.

9. An indicator according to claim 7, wherein said third means includes a decade counting register; and said fourth means includes a storage register coupled to said counting register and said second source, a decoder coupled to said storage register, and a four digit digital readout device coupled to said decoder.

10. An indicator according to claim 9, wherein said given period of time is selected so that said digital readout device provides said digital readout directly in gallons per hour of said fluid.

11. An indicator according to claim 10, wherein the value of N for both said first and second means is identical.

12. An indicator according to claim 11, wherein said value of N is selected from he range of integers 2 to 9 inclusive.

13. An indicator according to claim 12, wherein said fifth means includes a positive displacement type fluid flow meter.

14. An indicator according to claim 7, wherein said fifth means includes a positive displacement type fluid flow meter.

* * * * *